US012613810B2

(12) United States Patent
Liu et al.

(10) Patent No.: US 12,613,810 B2
(45) Date of Patent: Apr. 28, 2026

(54) METHOD FOR ADJUSTING MICRO CONTROL UNIT LATENCY FOR DATA PROCESSING

(71) Applicant: SHENZHEN HANGSHUN CHIP TECHNOLOGY DEVELOPMENT CO., LTD, Shenzhen (CN)

(72) Inventors: Jiping Liu, Shenzhen (CN); Haixu Mao, Shenzhen (CN); Xiang Wang, Shenzhen (CN)

(73) Assignee: SHENZHEN HANGSHUN CHIP TECHNOLOGY DEVELOPMENT CO., LTD, Shenzhen (CN)

( * ) Notice: Subject to any disclaimer, the term of this patent is extended or adjusted under 35 U.S.C. 154(b) by 12 days.

(21) Appl. No.: 18/577,149

(22) PCT Filed: Aug. 2, 2022

(86) PCT No.: PCT/CN2022/109603
§ 371 (c)(1),
(2) Date: Jan. 5, 2024

(87) PCT Pub. No.: WO2023/168894
PCT Pub. Date: Sep. 14, 2023

(65) Prior Publication Data
US 2024/0427711 A1      Dec. 26, 2024

(30) Foreign Application Priority Data
Mar. 8, 2022      (CN) .......................... 202210217684.5

(51) Int. Cl.
*G06F 13/16*      (2006.01)
*G06F 13/42*      (2006.01)

(52) U.S. Cl.
CPC ........ *G06F 13/161* (2013.01); *G06F 13/4291* (2013.01)

(58) Field of Classification Search
CPC ...... G06F 13/161; G06F 13/4291; G06F 1/04; G06F 13/40; G06F 13/16; G06F 1/324
See application file for complete search history.

(56) References Cited

U.S. PATENT DOCUMENTS

| | | | | |
|---|---|---|---|---|
| 5,247,636 A | * | 9/1993 | Minnick ................... | G06F 1/04 |
| | | | | 713/601 |
| 2012/0297232 A1 | | 11/2012 | Bircher ..................... | G06F 1/04 |

(Continued)

FOREIGN PATENT DOCUMENTS

| | | | | |
|---|---|---|---|---|
| CN | 101023403 | 8/2007 | .............. | G06F 1/26 |
| CN | 207133811 | 3/2018 | .............. | G06F 3/06 |

(Continued)

OTHER PUBLICATIONS

Office Action issued in Chinese Application No. 202210217684.5, dated Apr. 20, 2022, with translation, 14 pgs.

*Primary Examiner* — Jared I Rutz

(74) *Attorney, Agent, or Firm* — HAYES SOLOWAY P.C.

(57) ABSTRACT

A data processing method with a computer device and a readable storage medium has steps of obtaining a clock frequency, determining a latency corresponding to a flash based on the clock frequency, updating the clock frequency based on a current operating mode, adjusting the latency according to the updated clock frequency, and reading and writing data based on the adjusted latency. Thus, it is possible to improve the efficiency of the configuration of the latency, avoiding the situation in which the configured MCU chip would still have a system runaway, and thus improve the efficiency of data processing.

9 Claims, 4 Drawing Sheets

(56)     References Cited

U.S. PATENT DOCUMENTS

| 2017/0017587 | A1* | 1/2017 | West | .................... | G06F 13/4068 |
| 2018/0122438 | A1* | 5/2018 | Manning | .................. | G11C 7/22 |

FOREIGN PATENT DOCUMENTS

| CN | 111443587 | | 7/2020 | ............... | G04G 5/00 |
| CN | 111443587 A | * | 7/2020 | ............... | G04G 5/00 |
| CN | 111782027 | | 10/2020 | ............ | G06F 1/324 |
| CN | 112799723 | | 5/2021 | ............... | G06F 9/30 |
| CN | 114328312 | | 4/2022 | ............ | G06F 13/16 |
| WO | WO2006/004973 | | 1/2006 | ............... | G06F 1/26 |
| WO | WO2012/158728 | | 11/2012 | ............... | G06F 1/32 |

* cited by examiner

METHOD FOR ADJUSTING MICRO CONTROL UNIT LATENCY FOR DATA PROCESSING

FIELD OF THE DISCLOSURE

The present invention relates to the technical field of chip technology, in particular relates to a method of data processing, a computer device and a readable storage medium.

BACKGROUND

MCU (Micro Control Unit) contains non-volatile memory for storing program instructions and data. When the MCU is running, the internal CPU (Central Processing Unit) will fetch instructions from the non-volatile memory and execute them. Due to the high operating frequency of the MCU and the low operating frequency of the flash, in order to avoid the mismatch between the operating frequency of the MCU and that of the flash, which will lead to the situation of the system running out of control, the usual practice is that the MCU will increase the latency when fetching instructions from the flash, so that the system will run out of control. In order to avoid the mismatch between MCU operation frequency and the flash operation frequency, which leads to the system running away, the usual practice is to increase the latency when MCU is fetching instruction operation to the flash, so that the system can carry out normal fetch operation under different frequencies to ensure that the program can run normally. However, the current MCU chips generally require users to manually set the latency based on experience, which is not only inefficient in the configuration of the latency, but also may lead to the situation that the configured MCU chip will still have the system runaway, which will lead to the inefficiency of data processing.

BRIEF SUMMARY OF THE DISCLOSURE

In response to the above technical problems, the present application provides a method of data processing, a computer device, and a readable storage medium, which can improve the efficiency of the configuration of the latency, avoid the situation in which the configured MCU chip may still have the system runaway, and thus improve the efficiency of data processing.

To solve the above technical problem, the present application provides a data processing method comprising:

obtaining a clock frequency, determining a latency corresponding to a flash based on the clock frequency, updating the clock frequency based on a current operating mode, adjusting the latency based on the updated clock frequency, reading and writing data based on the adjusted latency.

Optionally, the updating the clock frequency based on a current operating mode comprising:

when the current operating mode is a first operating mode, obtaining an internal high-speed clock and updating the clock frequency based on the internal high-speed clock, when the current operating mode is a second operating mode, activating an input capture function of a timer and updating the clock frequency under a timer that activates the input capture function.

Optionally, the updating the clock frequency based on the internal high-speed clock comprising:

determining a number of oscillations of a clock counter at a recording period of a timer, updating the clock frequency based on the number of oscillations.

Optionally, the activating an input capture function of a timer and updating the clock frequency under a timer that activates the input capture function comprising:

capturing the period of the timer through the signal channel of the timer, determining a timer frequency for a current timer, updating the clock frequency based on the timer frequency and the captured period.

Optionally, the adjusting the latency according to an updated clock frequency comprising:

obtaining a mapping relationship between the clock frequency and the latency, determining a target latency corresponding to the updated clock frequency based on the mapping relationship, the reading and writing data based on the adjusted latency, comprising:

reading and writing data based on the target latency.

Optionally, before the updating the clock frequency based on the current operating mode, the method further comprising:

detecting a current power consumption mode, when the power consumption mode is detected as a high-power consumption mode, then performing the step of updating the clock frequency based on the current operating mode, when detecting the power consumption mode as a low-power consumption mode, adjusting the latency to a preset latency.

Optionally, the adjusting the latency to a preset latency when the power consumption mode is detected to be a low-power consumption mode comprising:

determining a cycle range corresponding to the low-power consumption mode, adjusting the latency to a maximum value of the period range.

Optionally, the data processing method further comprising:

performing the step of updating the clock frequency based on the current operating mode in response to the cycle auto-configuration function being turned on.

Optionally, the data processing method further comprising:

obtaining an input target latency in response to the cycle manual configuration function being turned on, reading and writing data based on the target latency.

The present application also provides a computer device comprising a memory and a processor, the memory storing a computer program, the processor implements the steps of the data processing method as described above when executing the computer program.

The present application also provides a readable storage medium, the readable storage medium stores a computer program, the computer program when executed by the processor realizes the steps of the data processing method as described above.

As described above, the data processing method of the present application obtains a clock frequency, determines a latency corresponding to flash based on the clock frequency, updates the clock frequency based on a current operating mode, adjusts the latency based on the updated clock frequency, and reads and writes data based on the adjusted latency. By the above method, there is no need to manually configure the latency manually, which can improve the efficiency of the configuration of the latency, avoid the situation that the configured MCU chip will still have the situation of the system runaway, and thus improve the efficiency of the data processing.

BRIEF DESCRIPTION OF THE DRAWINGS

The accompanying drawings herein, which are incorporated into and form a part of the specification, illustrate embodiments conforming to the present application and are used in conjunction with the specification to explain the principles of the present application. In order to more clearly illustrate the technical solutions of the embodiments of the present application, the accompanying drawings required to be used in the description of the embodiments will be briefly described below, and it will be obvious to a person of ordinary skill in the art that other accompanying drawings can be obtained based on these drawings without creative labor.

Figure 1:
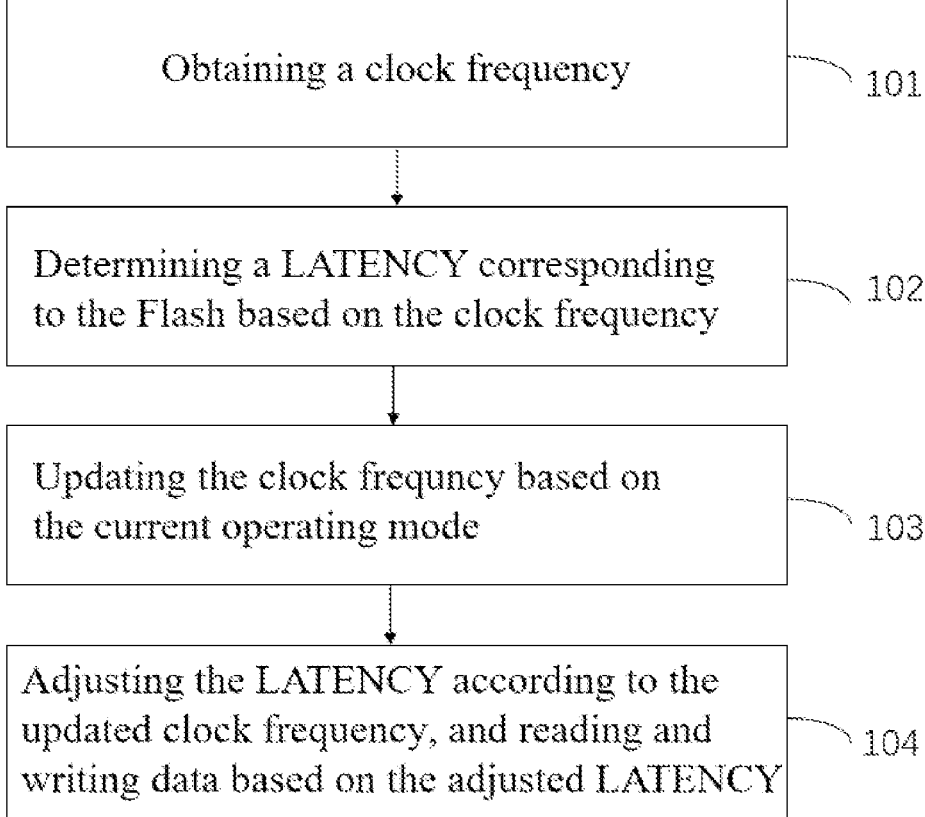
FIG. 1 is a schematic diagram of a flow of a data processing method provided by the present application.

The realization of the purpose, functional features and advantages of the present application may be further described in conjunction with the embodiments and with reference to the accompanying drawings. By means of the above-mentioned accompanying drawings, definite embodiments of the present application have been shown, which will be described in more detail later. These accompanying drawings and textual descriptions are not intended to limit the scope of the present application idea in any way, but rather to illustrate the concepts of the present application for those skilled in the art by reference to particular embodiments.

DETAILED DESCRIPTION OF EMBODIMENTS

Exemplary embodiments will be described herein in detail, examples of which are represented in the accompanying drawings. When the following description relates to the accompanying drawings, the same numerals in the different accompanying drawings indicate the same or similar elements unless otherwise indicated. The embodiments described in the following exemplary embodiments do not represent all embodiments consistent with the present application. Rather, they are only examples of apparatuses and methods consistent with some aspects of this application as detailed in the appended claims.

It should be noted that, as used herein, the terms "including", "comprising", or any other variant thereof, are intended to cover non-exclusive inclusion, such that a process, method, article, or apparatus that comprises a set of elements includes not only those elements but also other elements that are not expressly listed or that are inherent to such process, method, article or apparatus. Without further limitation, the fact that an element is defined by the statement "including a . . . " does not exclude the existence of another identical element in the process, method, article, or device including the element, and furthermore, parts, features, and elements having the same designation may have the same designation in different embodiments of the present application. In addition, parts, features, elements having the same name in different embodiments of the present application may have the same meaning or different meanings, and their specific meanings are to be determined by their interpretations in the specific embodiments or further in the context of the specific embodiments.

It should be understood that the specific embodiments described herein are intended only to explain the present application and are not intended to limit the present application.

In the ensuing description, suffixes such as "module", "part", or "unit" used to denote components are used only to facilitate the description of the present application and have no specific meaning in themselves. It has no specific meaning in itself. Therefore, "module", "part", or "unit" may be used in a mixed manner.

The following is a specific description of the embodiments involved in the present application, and it should be noted that the order in which the embodiments are described in the present application is not to be taken as a limitation of the order of priority of the embodiments.

MCU (Microcontroller Unit), also known as a single chip microcomputer or monolithic microcontroller, is the CPU (Central Process Unit) frequency and specifications to make the appropriate reduction, and may be the memory, a timer, a USB, an A/D conversion, an UART, a PLC, a DMA and other peripheral interfaces, and even a LCD driver circuitry are integrated into a single chip to form a chip-level computer for different applications to do different combinations of control.

When the MCU is running, the internal CPU will take instructions from the non-volatile memory and execute them, for example, read instructions from the flash and execute them. In general, the operating frequency of the MCU is higher than that of the flash, therefore, if no processing is performed on the MCU or the flash, there will be a mismatch between the operating frequency of the MCU and that of the flash, resulting in the system running away. The current practice is to artificially set the latency of the flash, for example, the user determines the latency of the flash corresponding to different system clocks by consulting the corresponding manuals or according to his own experience, so that the MCU can execute the program normally. However, the artificial setting method often results in a configuration error, leading to an abnormal system runaway after setting the latency. As can be seen, with the current scheme, not only is the configuration of the latency inefficient, but also there may be a situation in which the configured MCU chip may still have a system runaway, which in turn leads to inefficiency in data processing.

Based on this, embodiments of the present application provide a data processing device, which can perform the following steps: obtaining a clock frequency, determining a latency corresponding to the flash based on the clock frequency, updating the clock frequency based on the current operating mode, adjusting the latency according to the updated clock frequency, and reading and writing data based on the adjusted latency. By the above method, there is no need to manually configure the latency, which can improve the efficiency of the configuration of the latency, avoid the situation that the configured MCU chip may still have the system runaway, and thus improve the efficiency of data processing.

The following are described in detail respectively. It is to be noted that the following order of description of the embodiments does not serve as a limitation on the order of prioritization of the embodiments.

A method of data processing, comprising: obtaining a clock frequency, determining a latency corresponding to the flash based on the clock frequency, updating the clock frequency based on the current operating mode, adjusting the latency according to the updated clock frequency, and reading and writing data based on the adjusted latency.

Referring to FIG. 1, FIG. 1 shows a flow diagram of a data processing method provided by an embodiment of the present application. The specific flow of the data processing method may be as follows:

101, obtaining a clock frequency.

The clock frequency (also translated as: clock frequency speed), refers to the base frequency of the clock in the synchronization circuit, which is measured by "a number of cycles per second", and the unit of measurement adopts the SI unit of Hertz (Hz), and in the electronic technology. The pulse signal is a continuous pulse signal issued at certain time intervals according to a certain voltage amplitude. The time interval between the pulses is called the period, and the number of the pulses generated per unit of time (e.g., 1 second) is called the rate. The rate is a measurement name that describes the number of the pulses per unit of time in a periodic cyclic signal (including pulsed signals).

The computer is a typical signal generator, the signal generator sends out a pulse signal to make the cycle of the shortest time called oscillation period, also known as the CPU clock cycle. It is the most basic and smallest time unit in a computer. In this case, every time a pulse (i.e., an oscillation cycle) arrives, the transistors within the chip change state once, allowing the entire chip to accomplish a certain task. The transistors may only change state once during an oscillation cycle. As a result, smaller clock cycles mean higher operating frequencies. The number of oscillation cycles in a second is called the clock frequency, commonly known as the basic frequency.

Optionally, a high-frequency clock signal can be used to trigger sampling a low-frequency clock signal to obtain the frequency of the low-frequency clock signal, i.e., the clock frequency is obtained by a high-frequency clock signal.

102, according to the clock frequency, the corresponding latency of the flash is determined.

In order to accurately read the data inside the flash, the latency must be set correctly in the flash access control register according to the clock frequency of the CPU and the device power supply voltage. The prefetch buffer must be turned off when the supply voltage is lower than 2.1 V. The CPU clock frequency is the internal 16M RC oscillator, and the default latency is 0, which means 1 latency. The supply voltage is usually 3.3V, so before setting the 72 MHz frequency as the CPU clock, the latency must be set to 3. Otherwise, the flash read/write may be in error, resulting in a crash, i.e., it is understandable that after the CPU is powered on, it will give the flash a default latency according to the clock frequency.

103, updating the clock frequency based on the current operating mode.

Among them, the operating mode may include a first operating mode and a second operating mode, optionally, in some embodiments, the first operating mode may be a power-on mode, and the second operating mode may be a running mode, and in different operating modes, the clock frequency is updated in different ways, that is, optionally, the step "updating the clock frequency based on the current operating mode", which may include:

(11) if the current operating mode is a first operating mode, obtaining an internal high-speed clock, and updating the clock frequency based on the internal high-speed clock,

(12) if the current operating mode is a second operating mode, activating the input capture function of the timer, and updating the clock frequency under the timer that activates the input capture function.

One of the necessary conditions for the normal operation of the MCU is the clock circuit, the MCU works under the control of a unified clock pulse. When the MCU in operation, a pulse signal is needed as a trigger signal for the execution of its instructions, at this time it is necessary for crystal oscillator to generate a corresponding sinusoidal wave, the crystal oscillator, which the full name is the quartz crystal oscillator, is a kind of high-precision and high-stability oscillator. Through certain external circuits, it can generate the sinusoidal wave with stable frequency and peak value.

At the system startup, the internal high-speed clock of the MCU is used by default, and the clock frequency can be updated based on the number of times the clock counter oscillates under a clock cycle, i.e., optionally, in some embodiments, the step of "updating the clock frequency based on the internal high-speed clock" can specifically include:

(21) determining a number of oscillations of the clock counter under a recording period of the timer,

(22) updating the clock frequency based on the number of oscillations.

For example, specifically, the number of times the clock counter vibrates under a clock cycle is recorded by the timer and the clock frequency is derived by a frequency calculator, a timing moment=1/internal high-speed clock frequency, the number of vibrations recorded by the clock counter in a timing moment is recorded, and the clock frequency is updated by calculating the ratio of the amplified timing moment to the number of vibrations by a frequency calculator.

During operation of the system, the clock frequency needs to be increased and the latency of the flash needs to be switched at the same time, therefore, it is necessary to update the clock frequency by using the timer to capture inputs of the signal channel, i.e., optionally, in some embodiments, the step of "updating the clock frequency under a timer that activates the input capture function", may specifically include:

(31) capturing a period of the timer through a signal channel of the timer,

(32) determining a timer frequency of the current timer,

(33) updating the clock frequency based on the timer frequency and the captured period.

Figure 2:
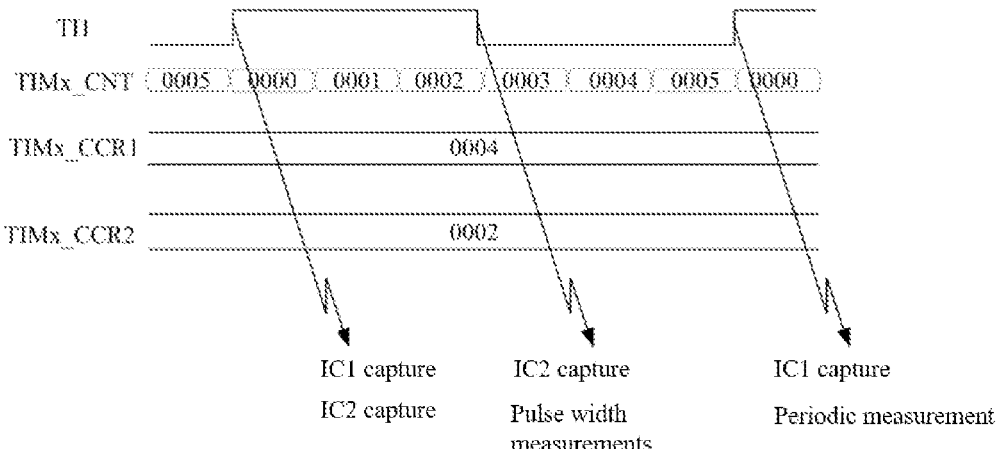
FIG. 2 is a schematic diagram of a clock frequency updating in a data processing method provided by embodiments of the present application.

Refer to FIG. 2, TI1 is the signal channel of the timer, through the capture of the input of TI1, obtaining the period of TI1, and results in the current clock frequency, IC1 and IC2 for the use of the two signal channels in the timer, through the IC1 capture TI1's cycle measurement, as shown in the figure, one cycle experienced 6 timer counts (CNT), and then through the current clock used by the timer frequency, calculate currently the time needed for the current one CNT=1/clock frequency, 6 CNTs need (1/clock frequency)*6, then send the data to the frequency calculator, the frequency calculator calculates the clock frequency to be switched by amplifying the ratio of time to period.

Further, the power consumption mode of the MCU may include a high-power consumption mode and a low-power consumption mode, the high-power consumption mode contains two operating modes as described previously, and in the low-power consumption mode, the clock frequency is often reduced to ensure that the MCU operates at low power consumption, and in order to further enable the MCU to reduce the power consumption in the low power consumption mode, in some embodiments, it is also possible to adjust the latency to a preset latency. For example, the latency of the flash is adjusted to the maximum, i.e., the step "when the power consumption mode is detected to be a low-power mode, then adjust the latency to the presuppose latency", which may include:

(41) Determine the cycle range corresponding to the low-power mode,

(42) Adjust the latency to the maximum value of the cycle range.

The larger the latency, the better the CPU can run the application program at an extremely low frequency, and the power consumption of the whole chip can be reduced by configuring a large latency, and the power consumption of the MCU can be further reduced in certain scenarios that do not require high-speed processing capability.

Optionally, in some embodiments, the user may manually set the latency, i.e., the data processing method provided in the present application may specifically also include:

(51) responding to the cycle manual configuration function being turned on, obtaining an input target latency,

(52) reading and writing data based on the target latency.

Optionally, in some embodiments, an automatic configuration of the latency may also can be set, which means the data processing method provided by the present application specifically may also include: responding to the automatic configuration of the period function being turned on, performing the step of updating the clock frequency based on the current operating mode.

104. adjusting the latency according to the updated clock frequency, and reading and writing data based on the adjusted latency.

Among them, the method of reading and saving data needs to be determined according to the configuration format of the data, and the program for reading data can be executed at any time when the system is running, as long as the specific address of the data in the flash is known. It will not affect the executable code, and can be designed according to the actual needs of the system. The saving of data requires erasing and programming the flash, and when erasing and writing data, the system program generally does not run normally, so the saving of the flash data requires special treatment, which is generally operated when the system is shut down, and after the operation is finished, you can choose to turn off the system power or system reboot.

Optionally, in some embodiments, the step "adjusting the latency according to the updated clock frequency" may specifically include:

(61) obtaining a mapping relationship between the clock frequency and the latency,

(62) determining a target latency corresponding to the updated clock frequency according to the mapping relationship.

Optionally, the mapping relationship between the clock frequency and the latency may be pre-constructed, wherein chips of the same type may adopt the same mapping relationship or different mapping relationships, which means that each chip corresponds to a mapping relationship, and when the clock frequency is updated, the target latency corresponding to the updated clock frequency may be obtained by means of checking a table, e.g., refer to the following table:

| clock frequency (A) | LATENCY (T) |
| --- | --- |
| 0 MHz < A ≤ 24 MHz | T ≥ 0 |
| 24 MHz < A ≤ 48 MHz | T ≥ 1 |
| 48 MHz < A ≤ 72 MHz | T ≥ 2 |
| 72 MHz < A ≤ 96 MHz | T ≥ 3 |
| 96 MHz < A ≤ 120 MHz | T ≥ 4 |
| 120 MHz < A ≤ 144 MHz | T ≥ 6 |
| 144 MHz < A ≤ 168 MHz | T ≥ 7 |

After adjusting the latency of the flash, then data reading and writing is performed under the adjusted flash, which means that data reading and writing is performed based on the target latency, and the specific data reading and writing process is not the focus of the present application, and may not be discussed herein.

Figure 3:
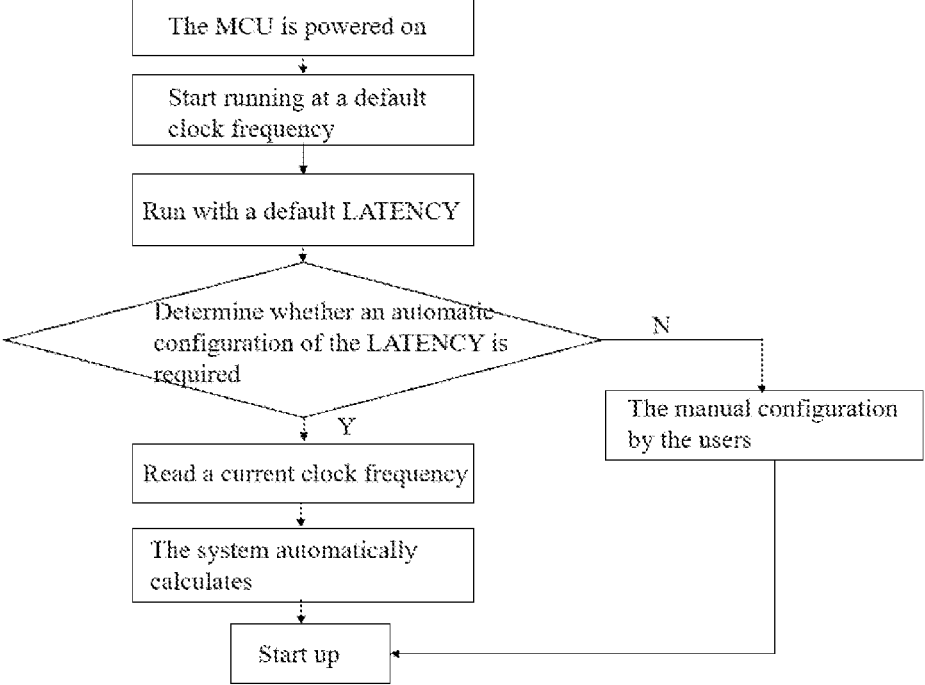
FIG. 3 is another flow schematic diagram of the data processing method provided by the present application.

In order to further understand the data processing method provided by the present application, the following is an example of a scenario in which the latency is automatically set for specific illustration, refer to FIG. 3, the MCU is powered on and started, the system program starts running, and at the initial runtime, since the system has not yet been configured with a clock frequency, the system may start running at a default clock frequency, run with a latency that matches the default clock frequency and wait for the clock to be configured, read to determine whether automatic configuration of the latency is required, if it is automatic configuration, then read the current clock frequency, the system may automatically calculate the frequency and automatically derive the value of the latency that needs to be configured, and the value maybe written into the flash corresponding register, optionally, if automatic configuration is not required, then enter the manual configuration mode, the user needs to manually write the value of the latency, and the system may start up after the configuration is complete.

Figure 4:
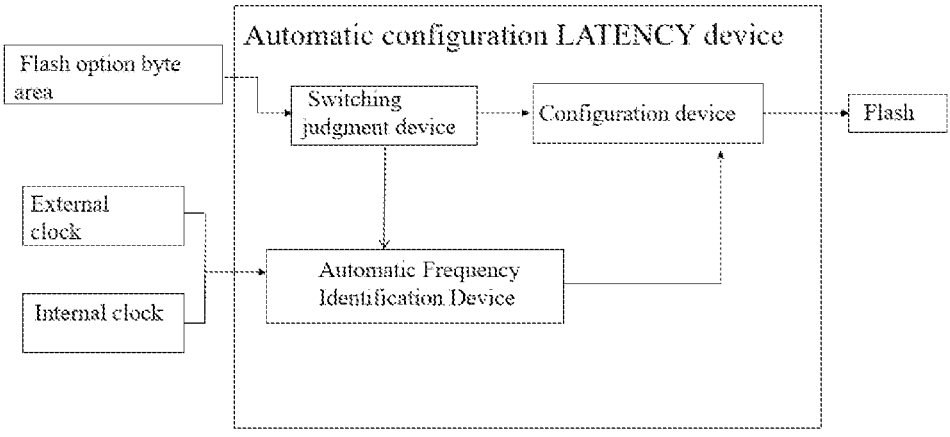
FIG. 4 is a schematic diagram of a structure of an automatic configuration latency device provided by the present application.

Further, refer to FIG. 4, an automatic configuration latency device can be integrated within the MCU, after the system is powered on, waiting for the system to obtain a stable clock frequency, the automatic configuration latency device begins to operate, it may first determine whether the automatic configuration latency device is open (default state: open), after opening, the automatic identification frequency device begins to identify the system frequency to determine, after the completion of the judgment, the configuration device, the configuration device calculates an optimal latency for the current flash according to the system frequency given by the frequency device, and writes it into the flash register. After waiting for the writing to be completed, the program continues to run. The automatic configuration latency device can switch the latency in real time while the system switches different clock frequency.

Figure 5:
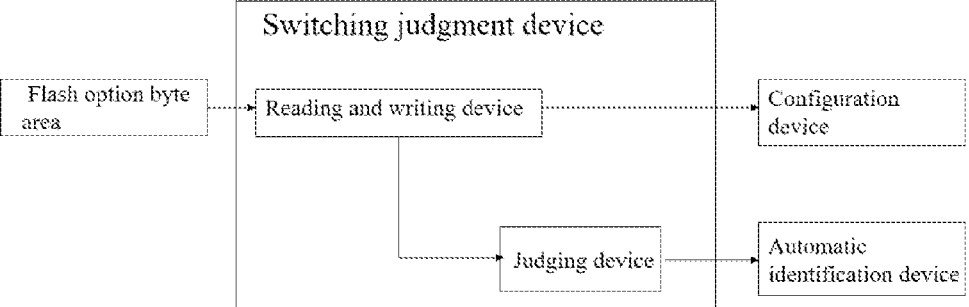
FIG. 5 is a schematic diagram of a structure of a switch judgment device provided by the present application.

Among them, the switching judgment device reads the configuration information in the option byte area through the reading and writing device, and the configuration information is the parameter of whether the latency is automatically turned on, after the reading is completed, the judging device determines whether the latency needs to be automatically configured, and thus switches on and off the auto-recognition device, as shown in FIG. 5.

Figure 6:
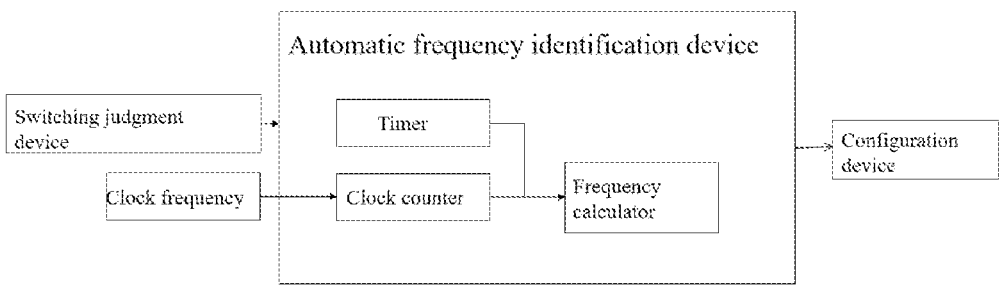
FIG. 6 is a schematic diagram of a structure of an automatic frequency identification device provided by the present application.

An automatic frequency identification device through the timer and the clock counter to calculate the external clock frequency to derive the current system clock frequency, the automatic frequency identification device can identify an external high-speed clock, an external low-speed clock, an internal high-speed clock, an internal low-speed clock, as well as PLL clocks and other clocks, the timer using the MCU's internal clock source to provide time information as a reference, the clock counter is used to record the number of oscillations of the external clock, and finally the clock frequency is calculated by the frequency calculator, this clock frequency value is then processed and sent to the configuration device, as shown in FIG. 6.

Figure 7:
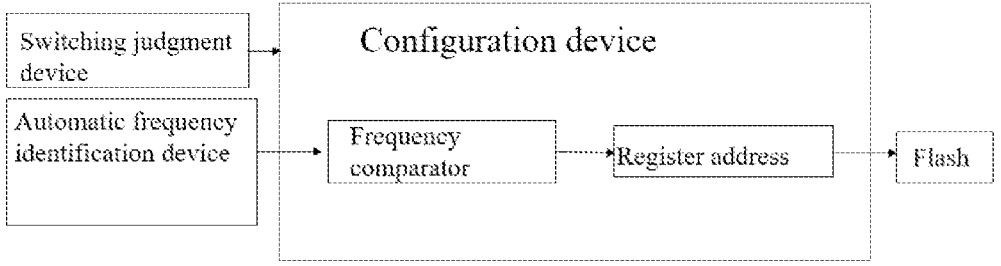
FIG. 7 is a schematic diagram of the structure of the configuration device provided by the present application.

The frequency derived by the automatic frequency identification device is processed and sent to the configuration device, and the configuration device derives the current latency to be configured from the frequency comparator, writes the latency into the corresponding register address, and the system may run with the current latency, as shown in FIG. 7.

As can be seen from the above, the present application provides a data processing method that, after obtaining a clock frequency, determines a latency corresponding to the flash based on the clock frequency, then updates the clock frequency based on the current operating mode, and finally, adjusts the latency according to the updated clock frequency and reads and writes the data based on the adjusted latency, and by the above means, there is no need to manually configure the latency, which can improve the efficiency of the latency configuration and avoid the situation that the configured MCU chip may still have the system runaway, so as to improve the efficiency of the data processing.

To facilitate better implementation of the data processing method of the present application, the present application also provides a data processing device based on the above-described data processing device. The meaning of the terms therein is the same as that in the above data processing method, and the specific realization details can be referred to the description in the method embodiment.

Figure 8:
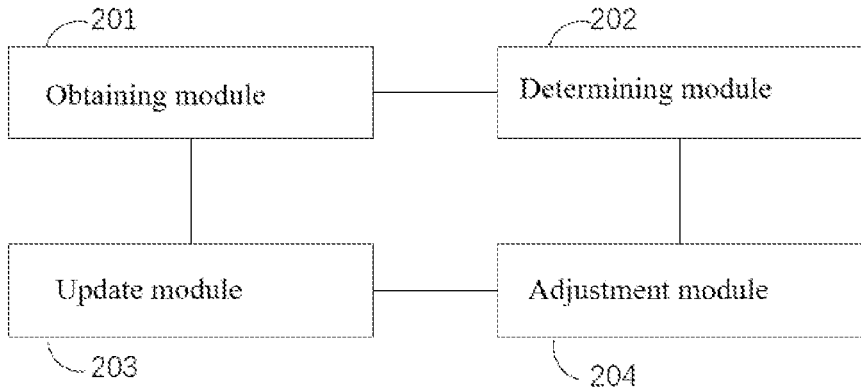
FIG. 8 is a schematic diagram of the structure of the data processing device provided by the present application.

Referring to FIG. 8, FIG. 8 shows a schematic diagram of a structure of the data processing device provided by the present application, wherein the data processing device may include an obtaining module 201, a determining module 202, an update module 203, and an adjustment module 204, which may be as follows:

The obtaining module 201 is used for obtaining a clock frequency.

Optionally, the obtaining module 201 may be triggered to sample a low-frequency clock signal with a high-frequency clock signal, thereby obtaining the frequency of the low-frequency clock signal, i.e., obtaining the clock frequency by a high-frequency clock signal.

The determining module 202 is used for determining a latency corresponding to the flash based on the clock frequency.

After the CPU is powered up, the flash is given a default latency based on the clock frequency, i.e., the determining module 202 can determine the corresponding latency of the flash.

The update module 203 for updating the clock frequency based on the current operating mode.

Wherein, the operating mode may include a first operating mode and a second operating mode, optionally, in some embodiments, the first operating mode may be a power-on mode, and the second operating mode may be a running mode, and under different operating modes, the clock frequency is updated in different ways, i.e., optionally, in some embodiments, the update module 203 may specifically include:

a first update unit for obtaining an internal high-speed clock if the current operating mode is the first operating mode, and updating the clock frequency based on the internal high-speed clock, a second update unit for, if the current operating mode is a second operating mode, activating an input capture function of the timer, and updating the clock frequency under the timer that activates the input capture function.

Optionally, in some embodiments, the first updating unit may specifically be used to: determine a number of oscillations of the clock counter under a recording period of the timer, and update the clock frequency based on the number of oscillations.

Optionally, in some embodiments, the second update unit may be specifically used to capture a period of the timer through a signal channel of the timer, determine a timer frequency of the current timer, update the clock frequency based on the timer frequency and the captured period.

The adjustment module 204 is used to adjust the latency based on the updated clock frequency, and read and write data based on the adjusted latency.

As can be seen from the above, the present application provides a data processing device in which, after the obtaining module 201 acquires a clock frequency, the determining module 202 determines a latency corresponding to the flash based on the clock frequency, followed by the update module 203 updating the clock frequency based on the current operating mode, and finally, the adjustment module 204 adjusts the latency according to the updated clock frequency and reads and writes data based on the adjusted latency. By the above method, there is no need to manually carry out the configuration of the latency, which can improve the efficiency of the configuration of the latency, avoid the situation in which the configured MCU chip may still have a system runaway, and thus improve the efficiency of data processing.

A person of ordinary skill in the art may understand that all or some of the steps in the various methods of the above embodiments may be accomplished by instructions, or by controlling the relevant hardware by instructions, which may be stored in a computer-readable storage medium and loaded and executed by a processor.

To this end, embodiments of the present application provide a storage medium in which a plurality of instructions are stored, which instructions are capable of being loaded by a processor to perform the steps in any of the data processing methods provided by embodiments of the present application.

The specific implementation of each of the above operations can be found in the preceding embodiments and will not be repeated here.

Among other things, the storage medium may include: a ROM (Read Only Memory), a RAM (Random Access Memory), a disk, or a CD-ROM, and the like.

Since the instructions stored in the storage medium can perform the steps in any one of the data detection methods provided by the embodiments of the present application, the beneficial effects that can be achieved by any one of the data processing methods provided by the embodiments of the present application can be realized, as detailed in the preceding embodiments, and may not be repeated herein.

Embodiments of the present application also provide a chip comprising a memory and a processor, the memory for storing a computer program, and the processor for transferring and running the computer program from the memory, such that a device in which the chip is installed executes a method as in the various possible embodiments above.

It is understood that the above scenarios are only intended as examples and do not constitute a limitation on the application scenarios of the technical solutions provided by the embodiments of the present application, and the technical solutions of the present application may also be applied to other scenarios. For example, a person of ordinary skill in the art may know that with the evolution of the system architecture and the emergence of new business scenarios, the technical solutions provided by the embodiments of the present application are equally applicable to similar technical problems.

The steps in the method of the embodiments of the present application may be sequentially adjusted, merged and deleted according to actual needs.

The units in the apparatus of the embodiments of the present application can be merged, divided and deleted according to actual needs.

In this application, the same or similar terminology concepts, technical solutions and/or application scenarios are generally described in detail only at the first occurrence, and when they are repeated later, they are generally not repeated again for the sake of conciseness, and when understanding the technical solutions and other contents of this application, the same or similar terminology concepts, technical solutions and/or application scenarios that are not described in detail later may be referred to in their previous relevant detailed descriptions.

In this application, the description of each embodiment has its own emphasis, and the parts that are not described or documented in detail in an embodiment can be referred to the relevant descriptions of other embodiments.

The various technical features of the technical solutions of the present application can be combined in any way, and for the sake of conciseness of description, all possible combinations of the various technical features in the above embodiments have not been described, however, as long as there is no contradiction in the combinations of these technical features, they should be considered to be within the scope of the present application as documented herein.

In the above-described embodiments, it may be realized in whole or in part by software, hardware, firmware, or any combination thereof. When implemented using software, it may be implemented, in whole or in part, in the form of a computer program product. The computer program product includes one or more computer instructions. When loaded and executed on a computer, the computer program instructions produce, in whole or in part, a process or function in accordance with embodiments of the present application. The computer may be a general-purpose computer, a specialized computer, a computer network, or other programmable device. The computer instructions may be stored in a computer-readable storage medium or transmitted from one computer-readable storage medium to another computer-readable storage medium, e.g., the computer instructions may be transmitted by wired (e.g., coaxial cable, fiber optic, digital subscriber line) or wireless (e.g., infrared, wireless, microwave, etc.) means from one site, computer, server, or data center to another site, computer, server, or data center for transmission. The computer-readable storage medium may be any usable medium that a computer can access or a data storage device such as a server, data center, etc. that contains one or more usable media integrated. The usable medium may be a magnetic medium, (e.g., a floppy disk, a memory disk, a tape), an optical medium (e.g., a DVD), or a semiconductor medium (e.g., a Solid State Disk, SSD), etc.

The above embodiments of the present application provides a data processing method, data processing equipment and storage media are described in detail, this paper applies specific examples of the principles of the present invention and the mode of implementation of the elaboration of the above embodiments are only used to help understand the method of the present application and its core ideas, at the same time, for the technical personnel in the field, based on the ideas of the present application, in the specific implementation and the scope of application will have changes in the scope of application of the application. At the same time, for the technical personnel in the field, according to the idea of the present application, there will be changes in the specific implementation and application scope, in summary, the contents of this specification should not be interpreted as a limitation of the present application.

What is claimed is:

1. A data processing method, comprising:

obtaining a clock frequency;

determining a latency value corresponding to a flash based on the clock frequency;

detecting a current power consumption mode;

acquiring an internal high-speed clock and updating the clock frequency based on the internal high-speed clock when the current power consumption mode is detected to be a high power consumption mode and a current operating mode is a first operating mode;

starting an input capture function of a timer and updating the clock frequency under a condition of the timer for starting the input capture function when the current power consumption mode is detected to be the high power consumption mode and the current operating mode is a second operating mode, wherein starting the input capture function of the timer and updating the clock frequency under a condition of the timer starting the input capture function comprises:

capturing a period of the timer through a signal channel of the timer;

determining timer frequency for a current timer; and updating the clock frequency based on the timer frequency and a captured period;

determining a period range corresponding to a low power consumption mode and adjusting the latency value to a preset latency value and adjusting the latency value to a maximum value of the period range when the current power consumption mode is detected to be a low-power consumption mode, adjusting the latency value based on the updated clock frequency, comprising:

obtaining a mapping relationship between the clock frequency and the latency value; and determining a target latency value corresponding to the updated clock frequency based on the mapping relationship;

wherein reading and writing the data based on the adjusted latency value, comprises:

reading and writing the data based on the target latency value; and reading and writing data based on the adjusted latency value.

2. The data processing method according to claim 1, wherein updating the clock frequency based on the internal high-speed clock comprises:

determining a number of oscillations of a clock counter at a recording period of the timer; and updating the clock frequency based on the number of oscillations.

3. The data processing method according to claim 1, further comprising:

updating the clock frequency based on the current operating mode in response to a cycle auto-configuration function being turned on.

4. The data processing method according to claim 1, wherein the method further comprises:

obtaining an input target latency value in response to a cycle manual configuration function being turned on; and reading and writing the data based on the input target latency value.

5. The data processing method according to claim 1, wherein a readable storage medium stores a computer program, the computer program, when executed by a processor, performs the data processing method.

6. A computer device comprising a memory and a processor, the memory storing a computer program, wherein, the processor implements steps of:

obtaining a clock frequency;

determining a latency value corresponding to a flash based on the clock frequency;

detecting a current power consumption mode; acquiring an internal high-speed clock and updating the clock frequency based on the internal high-speed clock when the current power consumption mode is detected to be a high power consumption mode and a current operating mode is a first operating mode; starting an input capture function of a timer and updating the clock frequency under a condition of the timer for starting the input capture function when the current power consumption mode is detected to be the high power consumption mode and the current operating mode is a second operating mode, wherein starting the input capture function of the timer and updating the clock frequency under a condition of the timer starting the input capture function comprises:

capturing a period of the timer through a signal channel of the timer;

determining timer frequency for a current timer; and updating the clock frequency based on the timer frequency and a captured period;

determining a period range corresponding to a low power consumption mode and adjusting the latency value to a preset latency value and adjusting the latency value to a maximum value of the period range when the current power consumption mode is detected to be a low-power consumption mode;

adjusting the latency value based on the updated clock frequency, comprising:

obtaining a mapping relationship between the clock frequency and the latency value; and determining a target latency value corresponding to the updated clock frequency based on the mapping relationship;

wherein reading and writing the data based on the adjusted latency value, comprises:

reading and writing the data based on the target latency value; and reading and writing data based on the adjusted latency value.

7. The computer device according to claim 6, wherein updating the clock frequency based on the internal high-speed clock comprises:

determining a number of oscillations of a clock counter at a recording period of the timer; and updating the clock frequency based on the number of oscillations.

8. The computer device according to claim 6, wherein, the processor further implements the steps of:

updating the clock frequency based on the current operating mode in response to a cycle auto-configuration function being turned on.

9. The computer device according to claim 6, wherein, the processor further implements the steps of:

obtaining an input target latency value in response to a cycle manual configuration function being turned on; and reading and writing the data based on the input target latency value.

* * * * *